April 8, 1930.  S. BOWER  1,753,916
MACHINE FOR APPLYING REENFORCEMENTS TO CLOTHESPINS
Filed Dec. 12, 1928   9 Sheets-Sheet 1
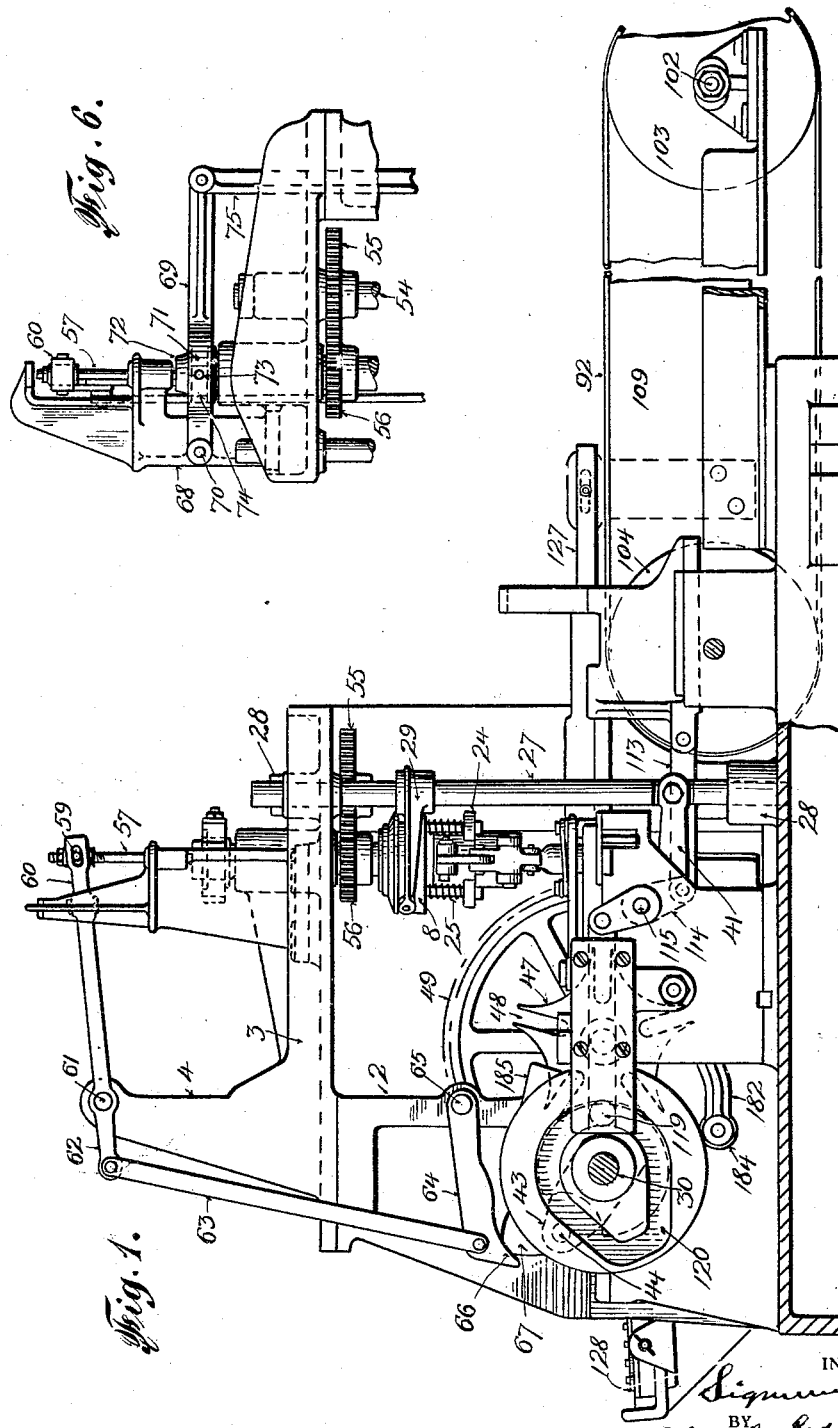
INVENTOR
BY
ATTORNEY

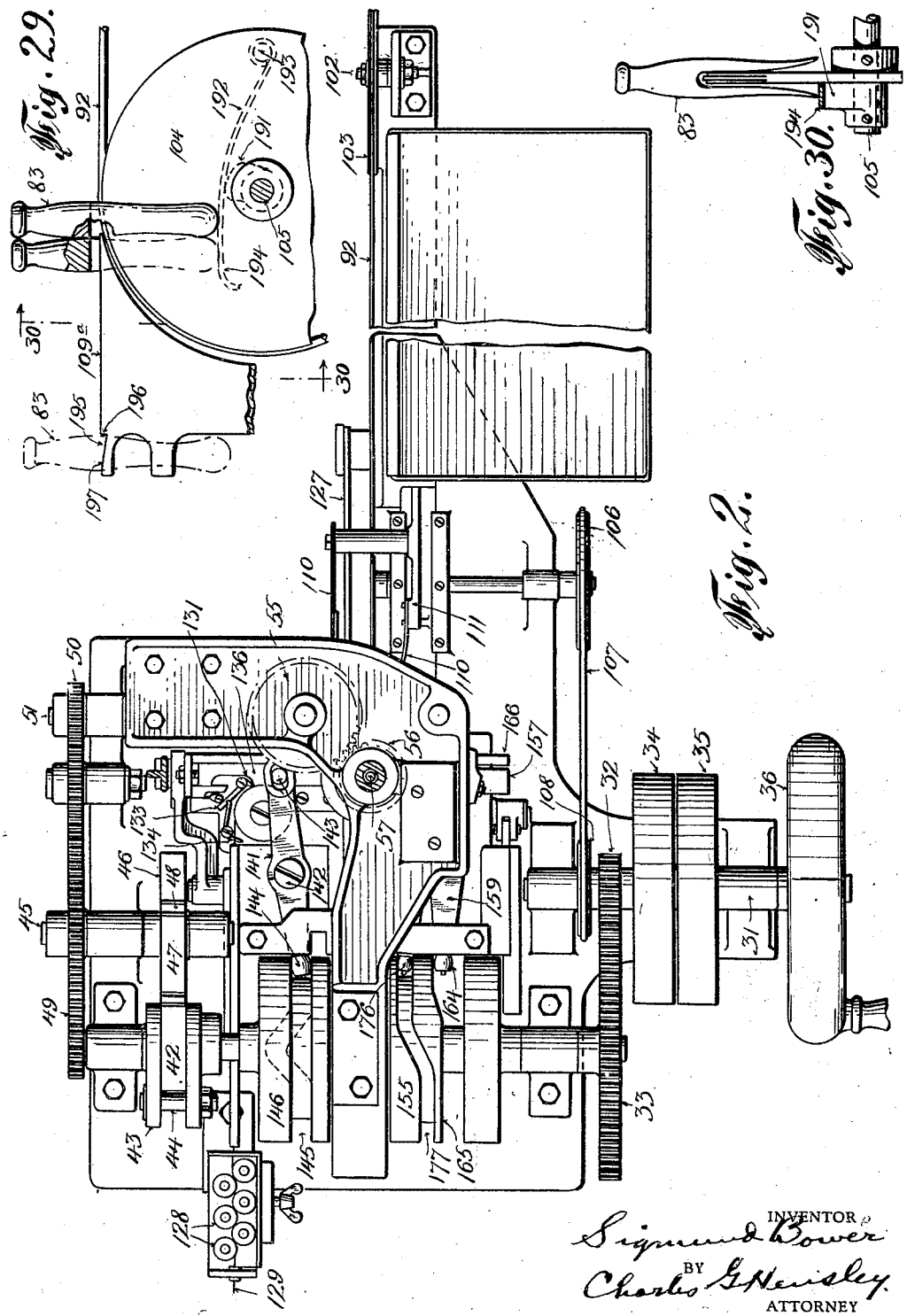

April 8, 1930. S. BOWER 1,753,916
MACHINE FOR APPLYING REENFORCEMENTS TO CLOTHESPINS
Filed Dec. 12, 1928 9 Sheets-Sheet 3

INVENTOR
Sigmund Bower
BY Charles G. Hensley
ATTORNEY

April 8, 1930.  S. BOWER  1,753,916
MACHINE FOR APPLYING REENFORCEMENTS TO CLOTHESPINS
Filed Dec. 12, 1928   9 Sheets-Sheet 4

INVENTOR
Sigmund Bower
BY Charles G. Hensley
ATTORNEY

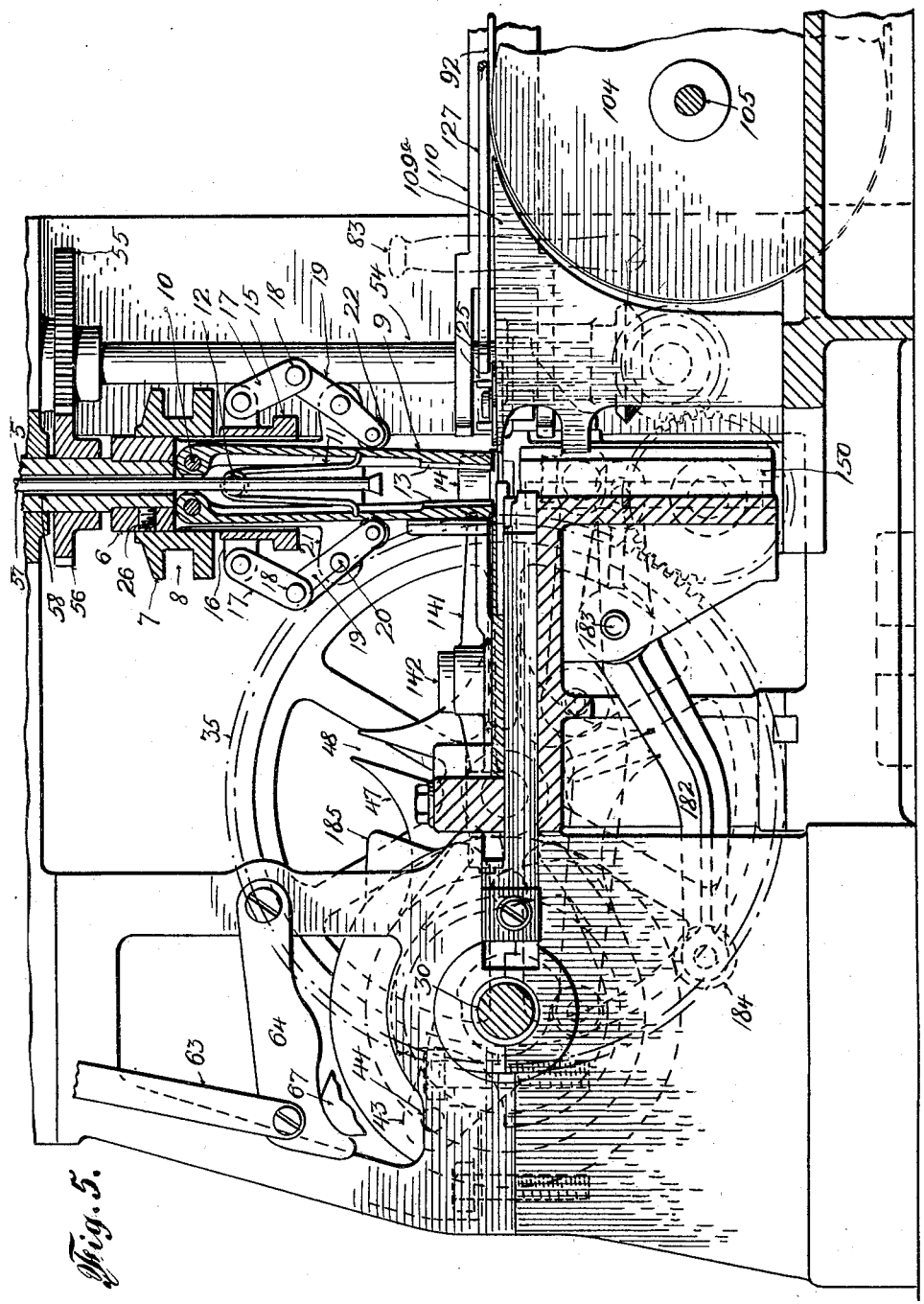

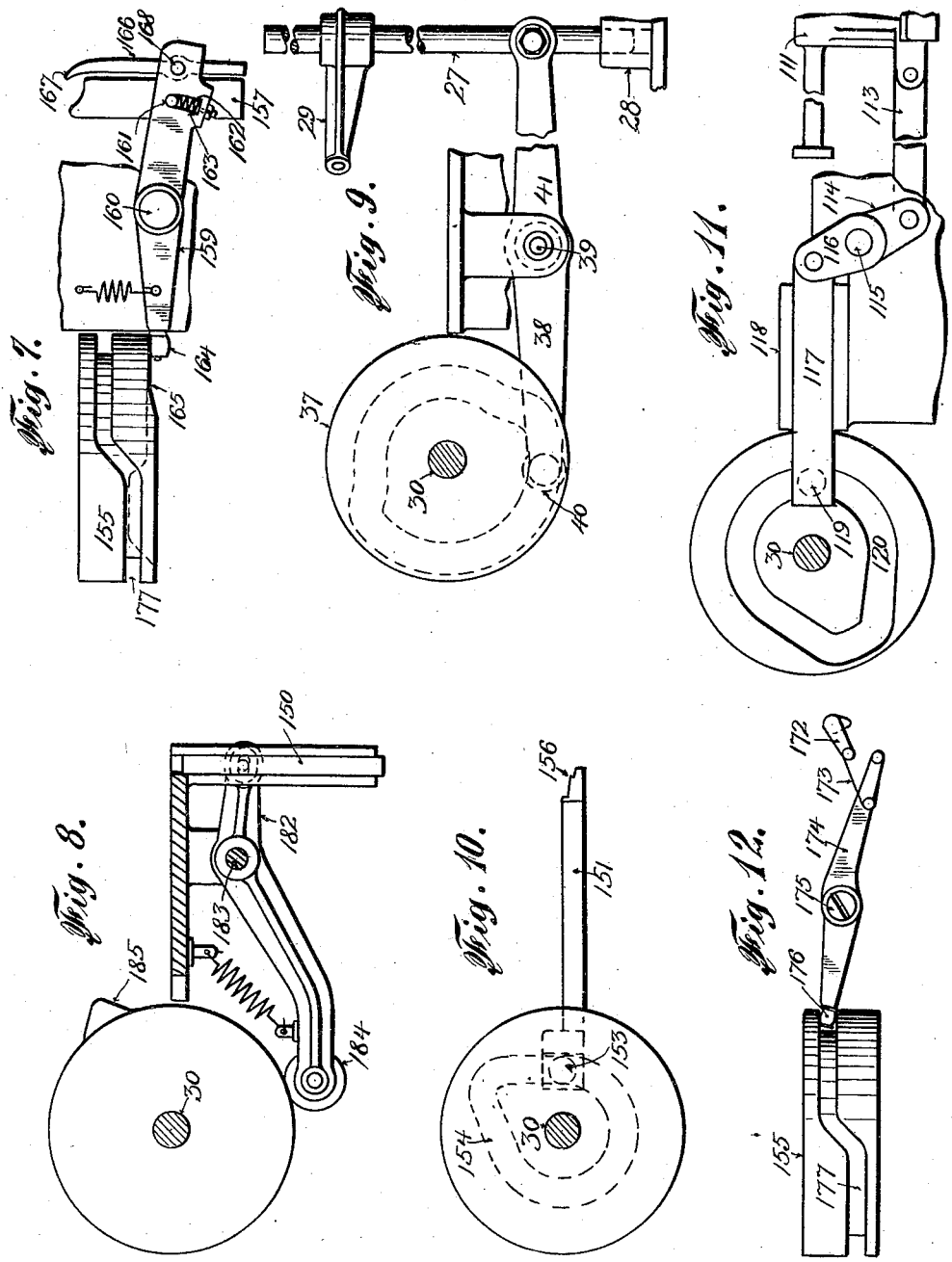

April 8, 1930.　　　　S. BOWER　　　　1,753,916
MACHINE FOR APPLYING REENFORCEMENTS TO CLOTHESPINS
Filed Dec. 12, 1928　　　9 Sheets-Sheet 7
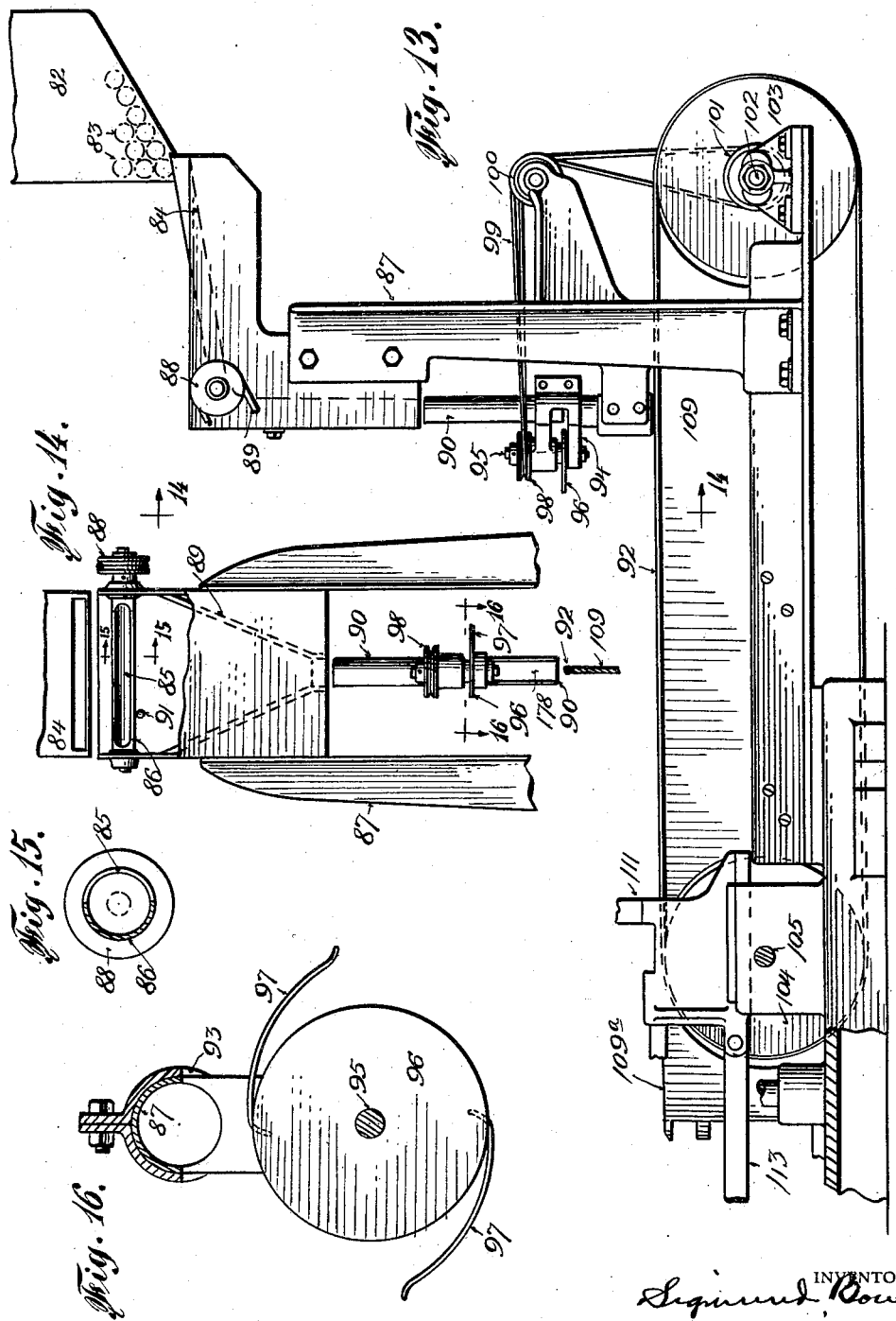

April 8, 1930.  S. BOWER  1,753,916
MACHINE FOR APPLYING REENFORCEMENTS TO CLOTHESPINS
Filed Dec. 12, 1928  9 Sheets-Sheet 8
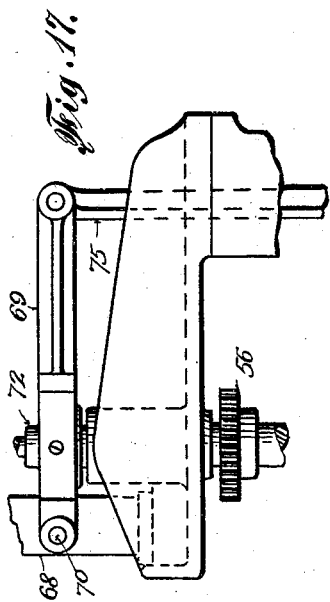
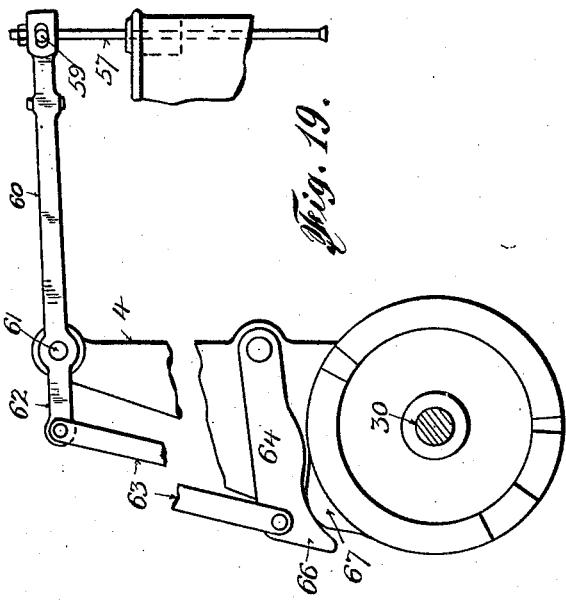
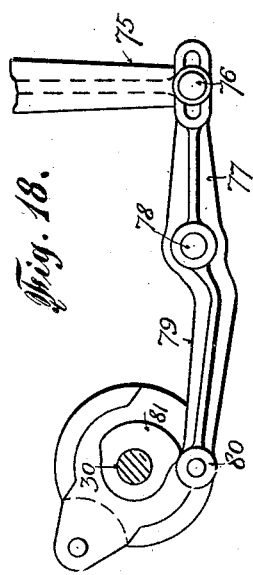
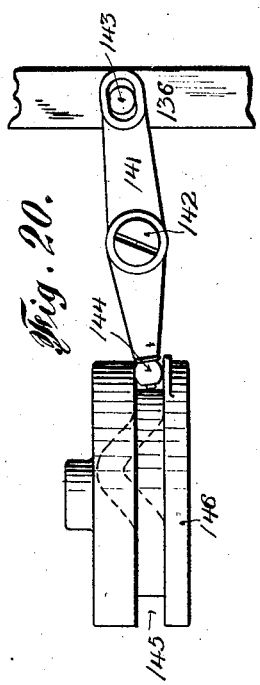
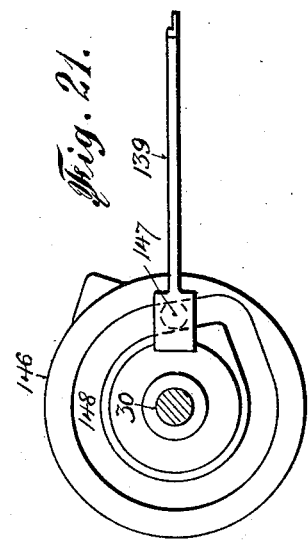
INVENTOR
Sigmund Bower
BY Charles G. Hensley.
ATTORNEY

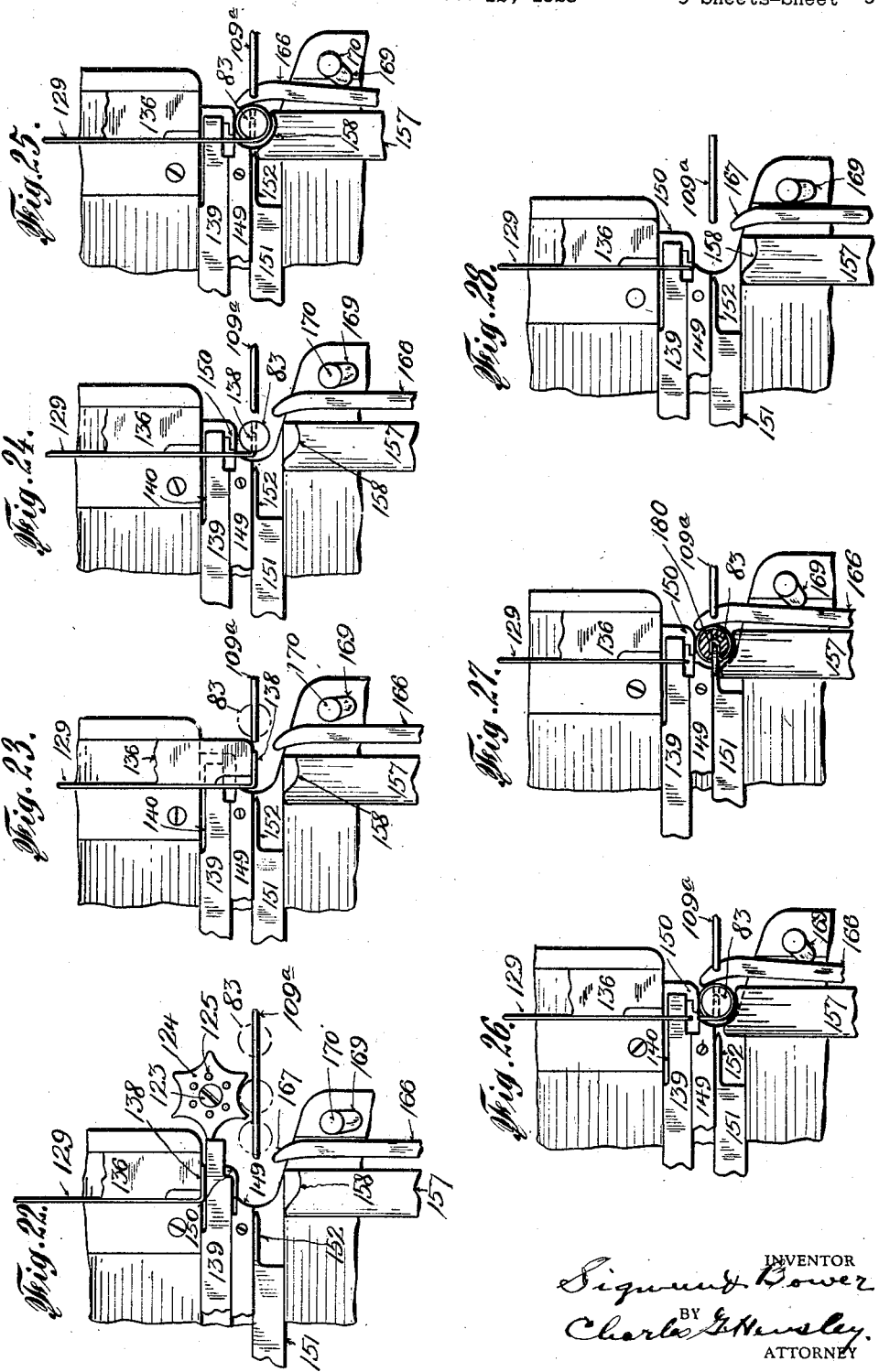

Patented Apr. 8, 1930

1,753,916

UNITED STATES PATENT OFFICE

SIGMUND BOWER, OF BROOKLYN, NEW YORK

MACHINE FOR APPLYING REENFORCEMENTS TO CLOTHESPINS

Application filed December 12, 1928. Serial No. 325,530.

The object of my invention is to provide a machine for automatically applying a reenforcing band or wire to clothes pins; and in the preferred embodiment of my invention the machine is adapted to apply to clothes pins the type of reenforcement shown and described in my Letters Patent No. 1,699,343. As will be observed in that patent, the ordinary wooden clothes pin which is subject to a splitting action when applied to a clothes line, is reenforced by a band or wire which is wound tightly around the body of the clothes pin adjacent the inner end of the slot; the ends of the wire extending into the slot of the clothes pin and engaging the walls of the slot in such manner as to hold the wire band in place under tension and reenforce the clothes pins so as to prevent breakage along the line of the grain where it is most susceptible to splitting action. The present machine is adapted to automatically apply reenforcement of this character to clothes pins at a rapid rate so that the total cost of the reenforcement and its application to the clothes pins may be kept within such limits as will permit the sale of the reenforced clothes pins at a reasonable price.

The machine embodies means for bringing the wire or band which is to form the reenforcement and the clothes pin into such relation that one end of the wire will project into the slot of the clothes pin adjacent the inner end of the slot; and in the preferred embodiment the wire is bent on the free end at right angles to the main portion of the wire before the clothes pin is brought into position upon this bent end of the wire. The machine also embodies a chuck or clutch for engaging the clothes pin and for revolving it after it has been initially brought into position on the free end of the wire and in such manner that as the clothes pin is revolved the reenforcing wire is coiled around it, the pin serving as a mandrel for the formation of the coiled portion of the wire. Means are provided for severing the wire adjacent the clothes pin after it has been wound around the latter, and means are provided for forcing the severed end of the wire laterally into the slot of the clothes pin in such manner as to form a loop, the arms of which expand laterally against the side walls of the slot of the clothes pin and firmly anchor this end of the wire reenforcement in place to resist any tendency of the coil of wire around the clothes pin to expand.

The operations are repeated in such sequence that the clothes pins follow one after the other in close order and receive their reenforcing bands and then discharge from the machine at a high rate of speed, so that the cost of applying the reenforcements is comparatively low. In addition to the features above enumerated I also provide means for automatically aligning the clothes pins to bring their slots in the same angular position in order to be received upon the reenforcing wire; and I provide means for feeding the clothes pins singly into position to receive the reenforcing wire.

As stated above, the various operations are automatically carried out in their proper sequence, and the machine may be power driven. The only labor required is that of supplying clothes pins to the machine.

Another object of the invention is to provide a machine for carrying out the above operations, which will be rugged and durable, and which will not be injured if a defective clothes pin is fed to the machine, even if such defective clothes pin should become destroyed by reason of its shape or proportions. Other objects, advantages and results will be set forth in the following detailed description of one embodiment of my invention.

In the drawings forming part of this application,

Figure 1 is a side elevation of a machine embodying my invention,

Figure 2 is a plan view thereof,

Figure 3:
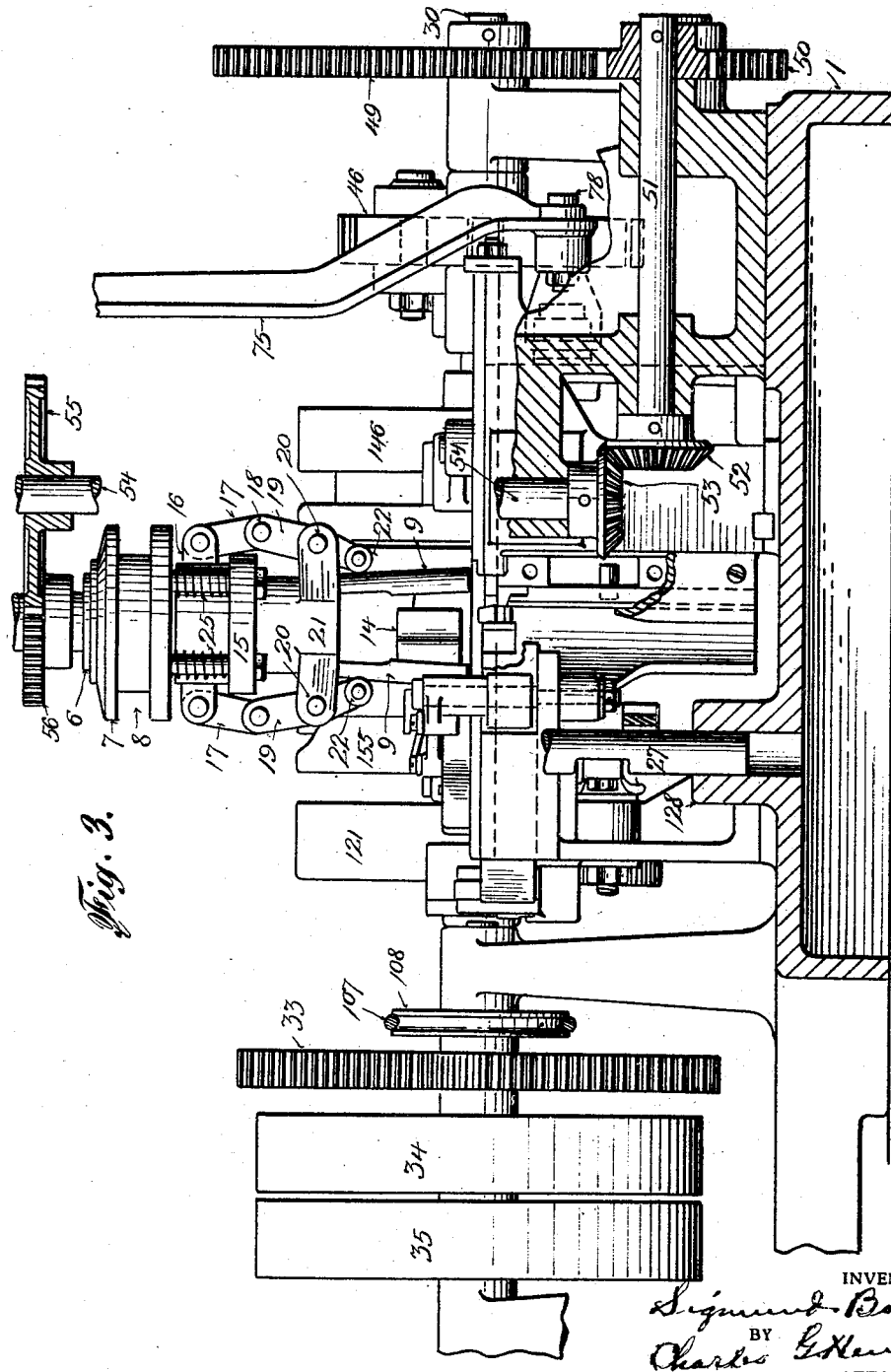
Figure 3 is an end view with portions broken away to show the details.
Figure 4:
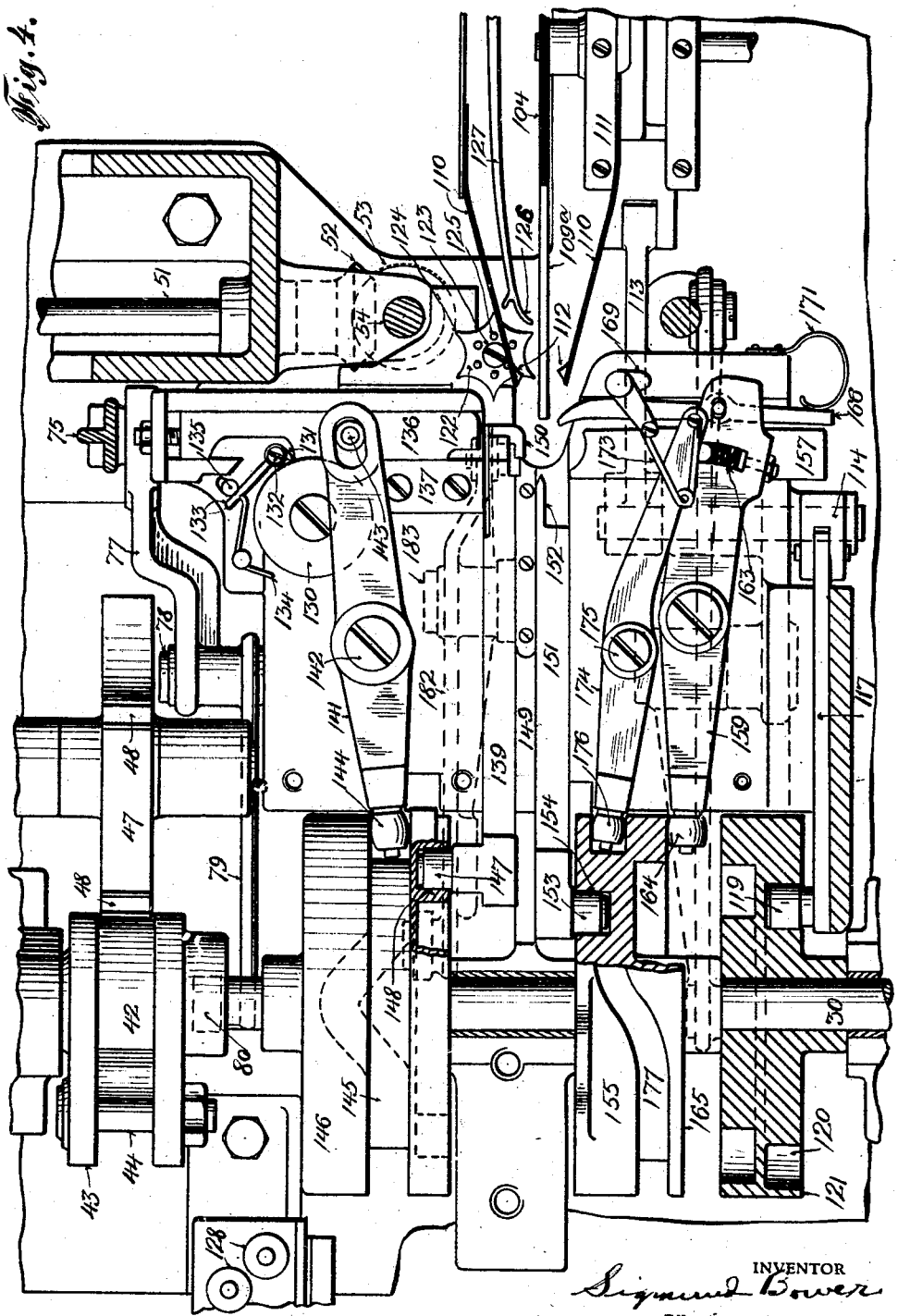

Figure 4 is a plan view of the bed and showing various lever movements with some of the parts broken away to show the interior construction, Figure 5 is a longitudinal, sectional view of the machine, Figure 6 is an elevation in detail showing the chuck operating members, Figure 7 is a plan view of one of the cam and lever movements for operating certain parts, Figure 8 is a sectional elevation showing another cam and lever movement for operating part of the mechanism, Figure 9 is an elevation of another cam and lever movement for operating other parts of the machine, Figure 10 is a cam and rod movement for operating still other parts of the mechanism, Figure 11 is an elevation of a cam and lever movement for operating part of the mechanism, Figure 12 is a side elevation of another cam and lever movement, Figure 13 is an elevation of the device for feeding the clothes pins into the machine, Figure 14 is a sectional view taken on the line 14—14 of Figure 13, Figure 15 is a sectional view taken on the line 15—15 of Figure 14, Figure 16 is a sectional view taken on the line 16—16 of Figure 14, Figure 17 is an elevation of the lever action for operating certain parts, Figure 18 is an elevation of a cam and lever device for operating certain parts, Figure 19 is an elevation of the cam and lever device for ejecting the pins from the chuck, Figures 20 and 21 are detail views of cam movement for operating certain parts, Figure 22 is a plan view of a portion of the bed and showing the tools which are grouped around the clothes pin while in position to receive the wire, Figures 23 to 28 inclusive are diagrammatic views showing the various movements of the several tools which form the wire and apply it to the clothes pins, Figure 29 is a detail view showing the means for moving the clothespins from the traveling belt onto the rail, the clothespins being partly broken away. Figure 30 is a sectional view taken on the line 30—30 of Figure 29.

In the drawings I have shown various mechanisms of a machine mounted on a frame 1 which is adapted to be supported upon a bench or any other type of support.

This frame has upwardly extending standards 2 with an upper horizontal frame member 3 and from the latter extend upwardly, brackets 4 for supporting certain of the elevated parts of the mechanism.

The clothes pins are adapted to be gripped by a revolvable chuck which, in the preferred form of the machine, engages the upper portion of the clothes pin; that is, the portion above the end of the slot; the pins being re-received individually by the chuck, and then clamped, and after being clamped the chuck revolves one and one-half turns while the wire is being wound upon the clothes pin; and after the wire has been cut and the end driven into the slot of the clothes pin, the chuck releases the pin and it is dropped or driven downwardly therefrom.

In the overhead portion of the frame of the machine I have shown a vertically disposed shaft 5 which carries the chuck; and this shaft is operated intermittently through a Geneva movement, as will be hereinafter described. The chuck shown herein includes a member 6 secured upon the lower end of the shaft 5 and it is provided with a slidable outer ring having flanges 7 providing an intermediate groove in which the rollers 8 engage to raise and lower the ring a slight extent. The body of the chuck extends downwardly below the end of the shaft 5 and is provided with oppositely disposed jaw members 9 which are pivoted at 10 within the body of the chuck, these jaws being normally urged outwardly or away from each other by the spring 11 which is coiled around the pin 12 inside the chuck body and the two ends of the spring press outwardly against the inner sides of the jaw members. The lower ends of the jaw members have curved plates 13 forming the jaws proper which are adapted to be pressed toward each other and against opposite sides of the upper portion of the clothes pin.

When the jaws are in open position there is a space at one side to receive the clothes pin laterally therein, and there is a guard plate 14 attached to the frame to span the gap between the jaw members when they are in open position, to prevent the clothes pin from traveling entirely through the space between the jaws.

There is a ring 15 slidable vertically along the chuck and it is provided with outwardly extending ears 16 at opposite sides on which toggle links 17 are pivotally connected at one end. These links extend downwardly at opposite sides of the chuck and are pivotally connected at 18 with lever arms 19 which latter fulcrum on the pins 20 which are mounted in the laterally extending ears 21 forming stationary parts of the chuck. The lower ends of the lever arms carry rollers 22 which engage the outer surfaces of the two jaw members 9 for the purpose of pressing them toward each other so that the jaws 13 grip upon the clothes pin.

There are spring posts 23 secured to the flanges 24 of the sliding sleeve or ring 15 to which the toggle links 17 are connected, and there are spiral springs 25 surrounding these posts, which springs are adapted to be compressed between the flange 24 and the sliding ring 26. When the latter ring is moved downwardly by the mechanism hereinafter described, it presses down on the springs 25 and these, in turn, press upon the flange 24 to move the sleeve 15 downwardly and by so doing operating through the links 17 and the lever arms 19 to press the jaws of the chuck inwardly toward each other for the purpose of gripping the clothes pin. Upward movement of the ring 26 releases this pressure and the sleeve 15 is moved upwardly as the levers 19 are rocked in the reverse direction by the spring 11 when opening the jaws in the chuck for the purpose of releasing the clothes pin.

I have shown a vertically oscillating shaft 27 mounted in suitable hubs 28 in the frame of the machine, and this shaft carries a fork 29 reaching partly around the ring 26 and provided with the rollers 8 which engage between the flanges 7 for the purpose of raising and lowering the ring 26.

The main shaft 30 of the machine, disposed horizontally and toward the rear, carries the various cams for operating the different parts of the mechanism. This shaft is driven from the shaft 31 through the pinion 32 on the latter and the gear 33 on the shaft 30. The power shaft 31 is adapted to be operated by means of a belt (not shown) which may engage over the fixed pulley 34 when the machine is in operation, or over a loose pulley 35 when the machine is stopped, and the belt may be operated from any source of power.

I have provided a hand wheel 36 on the same shaft 31 by means of which the machine may be turned over or partly turned over while threading the wire into the machine, and otherwise setting it up for operation.

On the main shaft 30 there is a cam 37 as shown in Figure 9. The lever 38 fulcrumed at 39 has a roller 40 engaging in the groove of this cam, whereby this lever is rocked periodically; and one arm 41 of the lever is pivotally connected to the vertically reciprocating shaft 27 and through these parts the latter is reciprocated for the purpose of moving the ring 26 up and down to open and close the jaws of the chuck. It will be noted that the rollers on the fork 29, while they are adapted to cause the up and down motion of the ring 26, do not prevent the latter from revolving in relation to the fork so that the opening and closing of the jaws is independent of the revolving motion of the chuck.

The chuck is revolved as follows: On the main shaft 30 there is one portion of the Geneva movement comprising the circular disc 42 having projecting flanges 43 at each side thereof; and there is a pin 44 connected between these flanges for operating on the second member of the Geneva movement. On a shaft 45 there is mounted the second member 46 of the Geneva movement commonly called the star member. This has a number of circular recesses 47 on its periphery corresponding with and adapted to fit the periphery of the disc 42 on the main shaft. It is provided also with the radial slots 48 which are adapted to be engaged by the pin 44 so that for each revolution of the main shaft 30 the member 46 of the Geneva movement is turned a portion of a revolution and is then locked. The action corresponds with the ordinary and well known action of the Geneva movement. This causes a periodical or intermittent revolution of the shaft 45 on which one of the members of the Geneva movement is mounted. On the shaft 45 on which the member 46 is mounted there is a gear 49 which meshes with and drives a gear 50 which is mounted on the shaft 51 journaled in the frame of the machine. On the end of the latter shaft there is a mitre gear 52 which meshes with and drives the mitre gear 53 which is mounted on the vertically disposed shaft 54. The upper end of this latter shaft has a gear 55 which meshes with and drives the gear 56 which latter is fixed to the chuck. The ratio of the gearing just described is such that each time the shaft 51 is rotated through the Geneva movement the chuck is revolved one and one-half revolutions, and this action is intermittent owing to the fact that the shaft 51 is intermittently operated through the Geneva movement.

I provide means for positively ejecting the clothes pin from the chuck after the reinforcing wire has been applied in the event it does not discharge by gravity, and this consists of the following: There is a vertical rod 57 extending through a central bore 58 of the chuck and the lower end of this rod, when the rod is raised, lies just above the head of the clothes pin when the latter is gripped in the jaws of the chuck. This rod, which is adapted to reciprocate in the bore of the chuck, is connected at its upper end by a pin and slot connection 59 with one arm 60 of a lever which fulcrums at 61 upon a pin mounted in the standard 4. The other arm 62 of this lever has pivotally connected to it a pitman 63 and the latter is pivotally connected at its other end with the lever arm 64 which is pivoted on a pin 65 mounted in the frame. The forward end 66 of this latter lever arm is adapted to be operated upon by a projection 67 on a cam mounted on the main shaft of the machine. Through these parts a reciprocating motion is imparted to the ejecting rod 57 at the moment the machine completes the application of the reinforcing wire to the clothes pin, so that this rod moves down rapidly and positively ejects the clothes pin from the jaws 13 as the latter open.

I have provided means for producing a slight vertical movement of the chuck bodily in relation to the wire handling tools in order that the second half turn of wire around the colthes pin will not overlap the first turn, but will lie closely adjacent thereto. For this purpose I have provided the following: On the standard 68 I have provided a lever 69 fulcrumed on the pin 70 and this lever has a yoke 71 surrounding a sleeve 72 which is attached to the upper end of the chuck.

The yoke 71 carries rollers 73 which engage in the groove 74 of the sleeve 72 so that the lever 69 may act on the sleeve 72 to raise and lower the chuck without interfering with its rotation. One arm of this lever 69 has pivoted to it a pitman 75 and the lower end of this pitman is connected by a pin and slot connection 76 with one arm 77 of a lever which is fulcrumed on the pin 78. The other arm 79 of this lever has a roller 80 which is operated upon by the cam 81 arranged on the main shaft 30, so that at each revolution of the main shaft the lever 79, 77 is rocked and the movement is imparted to the upper lever 69 for the purpose of periodically raising and lowering the chuck a distance corresponding, approximately, with the thickness of the wire which is attached to the clothes pin.

The means for feeding the clothes pins into the chuck consists of the following: There is a hopper 82 placed in an elevated position above the operating parts of the machine, in which a supply of clothes pins 83 are adapted to be placed. The clothes pins discharge from the lower end of this hopper onto an inclined plate 84 and roll down into the groove 85 of a revolving feeding member 86 which is journaled in the frame members 87. There is a pulley 88 on one end of this revolvable member and the belt 87, acting on this pulley, revolves the grooved member 86. The clothes pins traveling in a single layer down the inclined support 84 drop one at a time into the groove 85 of the member 86 and as the latter makes a revolution it carries one clothes pin in the groove 85 around with it until the clothes pin drops into the chute 89 and from there into the tube 90 in line with the bottom end of the chute.

In order that the clothes pins shall always drop into the tube 90 with the prongs downward, I have arranged a stationary pin 91 just below the grooved member 86, which pin is set at one side of the center of gravity of the clothes pins discharged from the groove 85. Looking at the parts as shown in Figure 14, if the clothes pin lies in the groove 85, then as the clothes pin is discharged from the grooved member it will momentarily touch the pin 91 and as this pin 91 is nearer one end of the clothes pin the latter will fall from the pin 91 with the prong end downward.

The clothes pin falling through the tube 90 with its forked end downward, will fall onto a belt 92 and if the prongs of the clothes pin straddle this belt, the clothes pin will be carried thereby out of the open side 93 of the tube 90 and will travel along with the belt. If the clothes pin should land against the belt so that the prongs do not straddle the latter, it will be agitated or turned until the prongs do straddle the belt, by the following means: There is a bracket 94 attached to the tube 90 and on this is a vertically disposed shaft 95 which carries a disc 96 lying in a horizontal position and provided with spring arms 97 projecting from it, which are adapted to project into the tube 90 at the open side thereof for the purpose of whipping against the surface of the clothes pin to revolve it sufficiently to bring the prongs to straddle the belt 92. These light springs whipping against the clothes pin agitate it or revolve it and at the same time permit the clothes pin to drop onto the belt 92 as soon as the prongs of the clothes pin straddle it.

There is a pulley 98 on the shaft 95 which is operated by a belt 99 which engages over the idler pulleys 100 and is operated by a pulley 101 on the shaft 102. From the foregoing description it will be apparent that a supply of clothes pins may be placed in the hopper 82 and they will be individually fed into the chute 89 by the grooved member 86 periodically and in time with the remaining portions of the machine, so that the same number of clothes pins per hour will be supplied to the conveying belt 92 as the mechanism for applying the reenforcement to the pin is adapted to handle. The clothes pins will always be dropped with their prong end downward into the tube 90 by means of the tipping pin 91.

If it is not desired to use the automatic feeding device above described, the operator may have a supply of clothes pins and may place them by hand with the prongs straddling the conveying belt 92. This belt, which is preferably formed of coiled piano wire like a spring, in order to carry the clothes pins with it, is endless, and it travels around a grooved pulley 103 mounted on the shaft 102 some distance ahead of the wire applying mechanism. The belt also travels around a pulley 104 which is mounted on the shaft 105 and this shaft has on one end a pulley 106 which is operated by the belt 107 which engages another pulley 108 on the drive shaft 31. I preferably employ a very thin rail 109 the upper edge of which is arranged adjacent the upper run of the conveying belt 92 to prevent this run of the belt from sagging, due to the weight of the clothes pins. The belt must necessarily be small in order to engage freely in the narrow slots of the clothes pins, and this supporting rail is desirable to prevent the supporting run of the belt from sagging, and to keep the pins upright on the belt.

Adjacent the top of the pulley 104 there is a supporting rail 109ª onto which the clothes pins pass from the belt 92 and this rail serves as a support for the clothes pins to a point adjacent the chuck, and until they pass onto the reenforcing wire as will be hereinafter described.

I have provided means for positively feeding the clothes pin over the rail 109 and onto the reenforcing wire. In Figures 2 and 4 I have shown resilient arms 110 carried by a block 111, the arms being disposed on opposite sides of the path of the clothes pins as they travel on the supporting rail 109. The forward ends of these arms 110 have projections 112 extending inwardly toward the row of clothes pins. The block 111 on which these arms are carried is adapted to be reciprocated, so that it makes one complete movement for each cycle of the machine. As shown in Figures 1 and 11 there is a link 113 pivoted to the reciprocating block 111 and the other end of this link is pivotally connected with a lever arm 114 which is carried upon the shaft 115. Another arm 116 of this lever also secured to this shaft is pivotally connected with the reciprocating rod 117 which travels in the bearing 118 and the opposite end of this rod is provided with a roller 119 which travels in the cam groove 120 of the cam 121 on the main shaft 30. As the main shaft makes one complete revolution, the rod 117 is reciprocated, and this causes the block 111, which carries the spring arms 110 to be reciprocated a distance corresponding, approximately, with the diameter of an individual clothes pin.

The projections 112 on the spring arms are pressed in between two adjacent clothes pins and when the block 111 moves to the left in Figure 4, or in Figure 1, the projections 112 engage behind the clothes pin and move it forwardly along the supporting rail 109, so that the clothes pin is moved onto the reenforcing wire. Upon the return movement of the block 111, the spring arms 110 yield and pass around a clothes pin on the supporting rail 109ª ready to engage behind the next succeeding pin.

In Figure 4 I have shown means serving as a hold-back to prevent retraction of the clothes pin on the supporting rail 109ª during the retractive movement of the spring arms 110. This consists of a star wheel 122 revolvably mounted on the screw 123 and adapted to revolve in a horizontal plane at the side of the supporting rail 109. The projections 124 of this star wheel are adapted to enter between the clothes pins on the supporting rail and to prevent retrograde movement thereof. This star wheel is provided with upwardly extending pins 125 which are adapted to be acted upon by the engaging end 126 on the spring arm 127, the latter being mounted on the block 111. Each time the arm 127 moves to the left in Figure 4, its angular end 126 engages one of the pins 125 of the star wheel and causes the star wheel to make a partial revolution, sufficient to allow one clothes pin to be fed forwardly by the feeding arms 110. The star wheel can only revolve in one direction and it therefore prevents return movement of the clothes pin on the rail 109ª while the spring arms 110 are escaping in their retractive movement past one of the clothes pins.

The device for feeding the wire into the position to be applied to the clothes pin is as follows: There is a set of wire straightening rollers 128 mounted on a support on the bed of the machine and these rollers serve to straighten the wire as it passes between them and it conforms with well known wire straighteners used in various arts. The wire 129 which is fed from a suitable spool, not shown, passes between the straightening rollers 128 and from there it passes partly around an idler pulley 130. There is a detent for preventing backward movement of the wire on this pulley and it consists of a clutch member 131 pivoted on the stud 132 and having a lever arm 133 which is pressed by the spring 134 to hold the clutch member 131 engaged against the wire on the pulley 130. There is an arm 135 to throw off the lever arm 133. The clutch member 131 prevents backward movement of the wire during the return movement of the die member 136. The leading edge of the wire passes from the clutch member 131 along one side of the die member 136 and between it and the plate 137 and it is bent at right angles, as shown at 138 against the forward end of this die, the bend being formed by a die member 139 which reciprocates at right angles to the die member 136 and across the end thereof, there being a groove 140 formed in the second die member corresponding with the thickness of the wire. The die member 139 reciprocates into the position shown in Figure 22 to bend the forward end of the wire across the die member 136, after which it withdraws in the manner hereinafter described. The die member 136 is reciprocated periodically by means of a lever 141 which is pivoted on the stud 142 on the top of the bed of the machine.

One arm of this lever has a slotted socket engaging the pin 143 on the die member. The other arm of this lever is provided with a roller 144 which engages the cam groove 145 of the cam 146 on a cam shaft 30. At each complete revolution of this cam shaft the lever 141 is reciprocated so that the die member 136 makes one complete reciprocation. The rear end of the die member 139 has a roller 147 which engages in the cam groove 148 of the cam 146 on the shaft 30 so that at each revolution of this shaft the end of the die member 139 is moved across the end of the die member 136 to form the bend 138 in the wire. There is a cutting tool 149 which is secured to the die member 139, so that it reciprocates therewith, the sharp forward edge of this cutting member being adapted to co-operate with the cutting member 150 for the purpose of severing the wire. There is a member for forcing the severed end of the wire into the crotch of the clothes pin and this also reciprocates parallel with the die member 139. It is shown as a sliding bar 151 provided with a blade 152 which reciprocates at right angles to the clothes pin. This bar is provided at its rear end with a roller 153 which engages in the cam groove 154 of one of the cams 155, on the cam shaft 30, so that at each complete revolution of this shaft the bar 151 is reciprocated toward and from the clothes pin which is in position to be supplied with a reenforcing wire. The blade 152 which directly acts upon the wire, has a hook 156 for engaging the wire, as shown in Figure 10, which hook carries the wire into the slot of the clothes pin.

I have provided means for effecting the bending of the wire around the clothes pin and means for resisting the deflection of the pin while the wire is being formed around it. There is a sliding bar 157 having its forward end curved, as shown at 158, to partially encircle the clothes pin at the line of application of the wire.

This bar is reciprocated by means of a lever 159 pivoted on the bed of the machine on the stud 160. There is a pin 161 projecting upwardly from the sliding block 157 and it passes through an arcuate slot 162 in one arm of the lever 159 just described. There is a coiled spring 163 arranged in this arcuate slot and pressing in one direction against the pin 161. In one direction of movement of the lever 159, the spring 163 acts against the pin 161 to move the sliding block 157 toward the clothes pin and to hold the curved end 158 close against the clothes pin with a resilient pressure. The other arm of the lever 159 is provided with a roller 164 which engages the cam surface 165 of the cam 155 on the cam shaft so that at each revolution of this latter shaft the lever 159 is rocked, causing one complete reciprocation of the slide block 157. There is a finger 166 having a curved forward end 167 adapted to engage on the side of the clothes pin, nearly opposite to the curved portion 158 of the wire bending slide and this arm is pivoted on the pin 168 in the end of the lever 159 so that the finger 166 is reciprocated with the slide block 157. There is a cam arm 169 on the pin 170 and it is adapted to press against the finger 166 to press the curved end 167 into engagement with the side of the clothes pin while the wire is being wound around the latter. This motion is in opposition to the curved spring 171 which presses on the one end of the finger 166 to hold the curved end 167 disengaged from the clothes pin except when this finger is pressed by the cam arm 169. On the same pin 170 which carries the arm 169 there is a lever arm 172 and with the free end of this there is connected a bent spring 173 the other end of which is pivotally connected with a pin on the lever 174.

The latter forms a lever which is pivoted on the bed of the machine on the pivot screw 175. The other arm of this lever is provided with a roller 176 which travels in the cam groove 177 of the cam 155 so that at each revolution of the cam shaft the lever 174 is oscillated so that it presses by spring action against the holding arm 172 and causes the latter to rock the cam arm 169 and press the finger 166 against the clothes pin while it is in a position to receive the reenforcing wire. The finger 166 therefore is reciprocated as well as rocked, the reciprocating motion being caused by the lever 159 and the rocking motion being caused by the lever 174. The cutting member 150 is periodically raised into position to co-operate with the cutting member 149, by the lever 182 (Figure 8) acting on the member 150. This lever is pivoted on the pin 183 and on one arm thereof there is a roller 184 which is acted on by the cam projection 185.

Operation

If the clothes pins are to be automatically fed onto the traveling belt 92 by the device shown in Figures 13 to 16, a supply of clothes pins 83 will be placed in the hopper 82. From the lower end or throat of the hopper the clothes pins will roll in a single layer down the inclined support 84, so that the lowermost pin is received into the groove 85 of the revolving feed member 86. At each revolution of the member 86 the clothes pin which falls into the groove 85 is carried around with this member and as the open side of the groove turns downwardly the clothes pin momentarily engages the pin 91 and from the temporary support of this pin the clothes pin drops into the chute 89 with the prong end of the pin directed downwardly.

The operations of the member 86 are repeated during each revolution, thereby taking the pins singly from the support 84 at each complete cycle of the machine or in time with the mechanism which applies the reenforcing wires to the pins.

As the pin drops through the chute 89 it falls with the prong end downwardly into the tube 90 and if the prongs of the pin, when the latter reaches the lower end of this tube, should straddle the conveying belt 92 and the rail 109 it will fall to its lowest position and it may be carried away by the belt 92 through the open side 178 of the tube 90. Should the prongs of the clothes pin, however, rest on the top of the belt 92 instead of straddling it, the springs 97 on the rapidly revolving disc 96 will whip against the clothes pin and revolve it until the prongs straddle the belt 92; or, in other words, until the slot of this clothes pin aligns with the belt 92 and as soon as this occurs the clothes pin will drop into the position straddling the belt 92 and the rail 109 in which case the pin will begin to travel with the belt. These operations are all automatic the only hand operation being that of supplying a quantity of the clothes pins to the hopper 82. If it is not desired to use the automatic feed, the operator will simply directly apply the clothes pin upon the belt 92 to straddle the latter and the rail 109, so that the clothes pin will be conveyed by the wire belt 92 along the top of the rail 109. When the clothes pins reach the pulley 104 they straddle the latter and then travel onto the supporting section 109ª of the rail being urged along by the row of pins which are traveling on the belt 92.

After the machine has been set into operation there will be a row of clothes pins reaching to the forward end of the supporting rail 109—109ª so that the prongs of the star wheel 122 will engage between clothes pins on the supporting rail. At each reciprocation of the block 111 first to the left in Figure 4 and then to the right, the spring arms 110 will feed a clothes pin off the end of the supporting rail 109ª and onto the bend 138 of the reinforcing wire. Starting at the position shown in Figure 4 the projections 112 of the spring arms 110 will project into the space between the endmost clothes pin on the supporting rail 109ª and the one just behind it. As the spring arms move to the left in Figure 4, the projections 112 will push the endmost clothes pin off the supporting rail onto the reinforcing wire, the star wheel 122 being moved one position by the arm 127 engaging one of the pins 125 at about the time the spring arms 110 make their feeding movement to the left in Figure 4. Upon the return movement of the block 111 the projections 112 escape past the endmost clothes pin on the rail 109ª so that they spring in behind this particular pin when the block 111 has returned to the right hand position shown in Figure 4, ready to feed the next clothes pin in the manner above described. The star wheel 122 is partially turned after the spring arms 110 move to the left in Figure 4 and then it remains stationary and prevents the endmost clothes pin from retracting on the rail 109ª while the projections 112 are passing behind it.

The devices for applying the reenforcing wire to the clothes pin operate in the sequence illustrated in Figures 22 to 28.

Assuming that the reenforcing wire has been threaded into the machine and that the parts have been brought to the position indicated in Figure 22, the following conditions will exist. The leading end of the die member 139 extends across the forward end of the die member 136, forming the bend 138 in the leading end of the wire. The bar 157 is at this time in retracted position, as well as the clamping finger 166. The reciprocating driver 152 is also in retracted position. From the conditions shown in Figure 22 the next step in the operation will be the retraction of the die member 139 and a slight retraction of the cutting tool 149 into the position shown in Figure 23. Just as the die member 139 retracts, the die member 136 moves at right angles thereto and with the bent end 138 of the wire lying against its leading end, advances toward the vertical axis of the chuck into the position shown in Figure 23. This causes the wire with its angular end 138 to be advanced into position to receive one of the clothes pins. The next stage in the operation is the retraction of the die member 136 the wire being prevented from retracting by the clutch member 131, so that the forward end of the wire remains in the position to which it was moved as in Figure 23. When the parts have reached the position shown in Figure 24, the die member 136 will have been retracted to its rearward position, and a clothes pin will have been fed from the rail 109ª by the operation of the feeding fingers 110 laterally onto the angular end 138 of the reenforcing wire, the latter extending into the slot of the clothes pin from one side and serving, by engaging the top end of the slot of the clothes pin, to support the pin until it is engaged by the chuck.

When the clothes pin is being moved into the position shown in Figure 24, it is also being moved through the open side of the jaws of the chuck, and when it arrives on the angular end 138 of the wire, it will lie substantially in the axis of the chuck. The only distance which the clothes pin has to be moved between the time the die member 136 is returned, and the time the pin arrives on the angular end of the wire, is the short distance from the end of the rail 109ª onto the end of the wire, so that the feeding of the pin can take place the instant the parts are in position to receive it. As the pin arrives at the position shown in Figure 24, the jaws of the chuck will be caused by the cam 37 to close about the upper end of the clothes pin, which is above the reenforcing wire. The abutting bar 157 will then move upwardly from the position shown in Figure 24 and into the position shown in Figure 25, so that its curved forward edge 158 may serve to prevent the deflection of the clothes pin in the chuck and also to form a socket against which the reenforcing wire may be forced to bend around the clothes pin. At the same time that the bar 157 goes forwardly, the finger 166 also goes forwardly into the position shown in Figure 25, so that its forward, curved end 167 may rest against the clothes pin on the opposite side of the curved edge of the bar 157; and when the finger 166 has arrived at this position it will be forced over toward the clothes pin by the cam arm 169 under the action of the cam groove 177 shown in Figure 4. When the parts have arrived at the position shown in Figure 25, the chuck will make one and one-half revolutions, As the clothes pin revolves with the bent end of the reenforcing wire projecting laterally into its slot, the wire will be wound around the clothes pin adjacent the upper end of the slot, making approximately one and one-half turns around the pin. At about the time the clothes pin has made one revolution, the chuck is lifted a distance approximately equal to the thickness of the reenforcing wire by the action of the cam 81 shown in Figure 18, so that as the clothes pin goes beyond one revolution, the next lay of the reenforcing wire will be alongside the first lay, due to the lifting of the clothes pin in relation to the wire under the action of the chuck and the cam 81. While the clothes pin is making the revolutions, the reenforcing wire is pressed, as shown in Figure 26, tightly against it, so that it is bent to conform thereto, and the clothes pin is prevented from deflecting away from the bar 157 by the finger 166. Both the bar 157 and the finger 166 press on the clothes pin with resistible pressure, by reason of the springs 163 and 173 respectively.

About the time the clothes pin has made one and one-half revolutions, as shown in Figure 26, the cutting member 149 will move to the right and co-operate with the stationary cutting member 150 to sever the wire, as shown in Figure 26, a short distance from the clothes pin, leaving the free end of the wire extending some distance across one side of the slot of the clothes pin. The next movement will be made by the bar 151 to the right into the position shown in Figure 27, so that the hook 156 on the driver 152 will engage the free end of the reenforcing wire in line with the slot of the clothes pin, the latter being now held stationary by the chuck. The hook 156 will carry the free end of the wire into the slot of the clothes pin, as shown in Figure 27.

This will form a loop 180 in the end of the wire, as the latter is forced into the slot of the clothes pin, and this loop will form a lock, pressing against the side surfaces of the slot of the pin to lock the second or last end of the reenforcing wire tightly in the clothes pin. The next stage in the operation of the machine is the retraction of the several sliding members into the position shown in Figure 28; that is to say, the cutting knife 149 will retract, the bar 151 carrying the driver 152 will retract, the lateral pressure on the finger 166 will have been relieved by the movement of the cam arm 169 and this finger, together with the bar 157 will be retracted to the position shown in Figure 28. The straight end of the reenforcing wire will be left projecting beyond the forward end of the die member 136 a sufficient distance for the co-operating die member 139 to bend this projecting portion across the front end of the die member 136 to form the second bend for the next succeeding clothes pin. When the parts arrive at the condition shown in Figure 28, the jaws of the clutch will be opened or released by the cam 81 so that the clothes pin, being no longer gripped by the chuck, and being otherwise unsupported, will drop out of the chuck and fall into a suitable receptacle. Should the clothes pin, for any reason, cling to the chuck, or fail to drop instantly, the ejecting rod 57 coming down quickly on top of the clothes pin will compel the latter to eject downwardly from the chuck. The operations above described will be repeated in the same sequence for the next succeeding clothes pin. The clothes pins are periodically fed along the rail 109, 109$^a$ by the fingers 110 at such time as to cause the clothes pin on the end of the rail 109$^a$ to move onto the bent end 138 of the reenforcing wire as soon as the die member 136 has withdrawn sufficiently.

Each time the feeding members retract to engage a new clothes pin, the star wheel remains stationary at this moment and prevents the clothes pin engaged by the star wheel from retracting until the feeding members 110 have engaged behind the next clothes pin, ready for the succeeding feeding operation. The star wheel is turned one tooth each time the feeding fingers go forwardly in the feeding operation.

In Figure 29 I have shown a modified form of the device for feeding the clothes pin into the chuck. I have shown on the shaft 105, which carries the pulley 104, a cam 191 which is adapted to act on a lever arm 192 which is pivoted on the stud 193 of the frame. The free end 194 of this lever arm is arranged under the forward end of the rail 109$^a$ which is the point where this rail receives the clothes pins as they pass from the belt 92. When the shaft 105 revolves, the cam 191 will periodically lift the lever arm 192 and the forward end 194 of this lever arm will press upwardly on the lower ends of the prongs of the clothes pins which are moving from the belt 92 onto the rail 109$^a$. That is, the clothes pins will be temporarily lifted by the arm 192 so that they will not stall against the forward edge of the rail 109$^a$. This lifting motion is only necessary momentarily and preferably during the period that the arms 110 are moving the end clothes pins off the rail 109$^a$.

In the same view I have shown means which will serve as a hold-back or detent for the clothes pins, which will serve the same function as the star wheel 122, and in a much more dependable manner.

The projecting end of the rail 109$^a$ is provided with a notch 195 which inclines upwardly to a point where the pins discharge onto the bent end 138 of the reenforcing wire. This notch forms a shoulder 196. As the clothes pins advance along the rail 109$^a$ the last one on this rail drops as it passes the shoulder 196 and rests on the lower surface 197, ready to be pushed off by the feed arms 110 onto the wire. As the last pin falls with the top of the slot onto the surface 197, this pin cannot then move backwardly on the rail 109ª because of the shoulder 196. This acts as a back stop or detent to prevent the end clothes pin from being displaced while the arms 110 are retracting behind this particular pin, ready to feed it forwardly on the next operation. The shoulder 196, therefore, performs the function performed by the star wheel in the previously described construction, but no movable parts are required in the form of the device shown in Figure 29.

Having described my invention, what I claim is:

1. In a machine of the class described the combination of a chuck adapted to grip and revolve a clothes pin, means for feeding a wire in relation to the clothes pin with the end of the wire projecting into the slot thereof, means for causing the rotation of the chuck whereby the reenforcing wire is wound around the clothes pin, and means for severing the wire and for forcing the severed end into locking engagement within the slot of the clothes pin.

2. In a machine of the class described, the combination of a chuck adapted to grip and revolve a clothes pin, means for feeding a wire in relation to the clothes pin, means for bending the wire at an angle to receive the clothes pin thereon, means for causing the rotation of the chuck whereby the reenforcing wire is wound around the clothes pin, and means for severing the wire and for forcing the severed end into locking engagement within the slot of the clothes pin.

3. In a machine of the class described, the combination of a chuck adapted to grip and revolve a clothes pin, means for feeding a wire in relation to the clothes pin, means for bending the leading end of the wire at an angle, means for feeding a clothes pin onto the bent end of the wire whereby the latter extends into the slot of the clothes pin, means for causing the rotation of the chuck whereby the reenforcing wire is wound around the clothes pin, and means for severing the wire and for forcing the severed end into locking engagement within the slot of the clothes pin.

4. In a machine of the class described the combination of a chuck adapted to grip and revolve a clothes pin, a support adapted to be straddled by the clothes pins, means for feeding a wire into position where the free end of the wire will be received into the slot of the clothes pin as it is pushed from said supporting member, means for causing the rotation of the chuck whereby the reenforcing wire is wound around the clothes pin, and means for severing the wire and for forcing the severed end into locking engagement within the slot of the clothes pin.

5 In a machine of the class described, the combination of a chuck adapted to grip and revolve a clothes pin, supporting means adapted to be straddled by the clothes pins, means for bending the leading end of a wire at an angle and for feeding the wire to bring said bent end in line with the slot of the clothes pin supported on said support, means for advancing a clothes pin from said support onto said bent end of the wire, means for causing the rotation of the chuck whereby the reenforcing wire is wound around the clothes pin, and means for severing the wire and for forcing the severed end into locking engagement within the slot of the clothes pin.

6. In a machine of the class described, the combination of a chuck adapted to grip and revolve a clothes pin, a supporting member for the clothes pins, adapted to be straddled thereby, means for bending the free end of a wire at an angle and for feeding said bent end into position in line with the slot of the clothes pin supported on said supporting member, said bent end of said wire being substantially in the same horizontal plane with said support, means for causing the rotation of the chuck whereby the reenforcing wire is wound around the clothes pin, and means for severing the wire and for forcing the severed end into locking engagement within the slot of the clothes pin.

7. In a machine of the class described, the combination of a chuck adapted to grip and revolve a clothes pin, means for bending the end of a wire at an angle and for feeding said bent end into position to receive a clothes pin, means for feeding a clothes pin onto said bent end of the wire, means for causing the rotation of the chuck whereby the reenforcing wire is wound around the clothes pin, a member forming an abutment against which the wire is adapted to bend around the clothes pin, and means for severing the wire and for forcing the severed end into locking engagement within the slot of the clothes pin.

8. In a machine of the class described, the combination of a chuck adapted to grip and revolve a clothes pin, means for bending the free end of a wire at an angle, means for feeding the wire to present said bent end in position to receive a clothes pin, means for feeding a clothes pin onto the said bent end of the wire, means for causing the rotation of the chuck whereby the reenforcing wire is wound around the clothes pin, a member having a curved surface partly encircling the clothes pin and against which said wire is adapted to bend while encircling the clothes pin, and means for severing the wire and for forcing the severed end into locking engagement within the slot of the clothes pin.

9. In a machine of the class described, the combination of a chuck adapted to grip and revolve a clothes pin, means for bending the free end of a wire at an angle and for feeding said bent end into position to receive a clothes pin, means for feeding a clothes pin to straddle said bent end of the wire, means for causing the rotation of the chuck whereby the reenforcing wire is wound around the clothes pin, means for applying resilient pressure against the exterior of the wire to cause it to conform to the clothes pin, and means for severing the wire and for forcing the severed end into locking engagement within the slot of the clothes pin.

10. In a machine of the class described, the combination of a chuck adapted to grip and revolve a clothes pin, means for bending the leading end of a wire at an angle and for feeding said bent end of the wire into position to receive a clothes pin, means for feeding a clothes pin to straddle said bent end of the wire, means for causing the rotation of the chuck whereby the reenforcing wire is wound around the clothes pin, a member adapted to apply resilient pressure against the wire to cause it to conform with the clothes pin, means for moving said latter means into and out of operative position with relation to the clothes pin and means for severing the wire and for forcing the severed end into locking engagement within the slot of the clothes pin.

11. In a machine of the class described, the combination of a chuck adapted to grip and revolve a clothes pin, means for feeding a wire in relation to the clothes pin, and means for feeding a clothes pin to straddle said wire, means for causing the rotation of the chuck more than one revolution whereby the reenforcing wire is wound around the clothes pin, means for causing a slight axial movement of the chuck and means for severing the wire and for forcing the severed end into locking engagement within the slot of the clothes pin.

12. In a machine of the class described, the combination of a chuck adapted to grip and revolve a clothes pin, means for feeding a wire in relation to the clothes pin, and means for feeding a clothes pin to straddle said wire, means for causing the rotation of the chuck more than one revolution whereby the reenforcing wire is wound around the clothes pin, means for causing a slight axial movement of the chuck simultaneously with its rotation, and means for severing the wire and for forcing the severed end into locking engagement within the slot of the clothes pin.

13. In a machine of the class described the combination of a chuck adapted to grip and revolve a clothes pin, a supporting member adapted to be straddled by the clothes pin, means for feeding the bent end of a wire into line with said support, means for feeding the clothes pin from the support onto said bent end, means for causing the rotation of the chuck whereby the reenforcing wire is wound around the clothes pin, a driver aligning with said clothes pin support on the opposite side of the clothes pin, means for severing the wire and means for operating said driver to force the severed end of the wire into the slot of the clothes pin.

14. In a machine of the class described, the combination of a chuck adapted to grip and revolve a clothes pin, a support adapted to be straddled by the clothes pins, a driver in line with said support and on the opposite side of the clothes pin, means for feeding the bent end of a wire into alignment with said support and said driver, means movable from the opposite side of the clothes pin to said wire feeding means for applying resistible pressure against the wire, means for causing the rotation of the chuck whereby the reenforcing wire is wound around the clothes pin, means for severing the wire, and means for operating said driver to force the severed end of the wire into the slot of the clothes pin.

15. In a machine of the class described, the combination of a chuck adapted to grip and revolve a clothes pin, a supporting member adapted to be straddled by the clothes pin, means for feeding the bent end of a wire into substantial alignment with the top of said support whereby the clothes pin may be pushed from said support onto said bent end of the wire, means for rotating the chuck whereby the reenforcing wire is wound around the clothes pin and means for severing the wire and for forcing the severed end into locking engagement within the slot of the clothes pin.

16. In a machine of the class described, the combination of a chuck adapted to grip and revolve a clothes pin, co-operating die members adapted to bend the leading end of a wire at an angle, one of said die members being adapted to carry the bent end of the wire forwardly into position to receive a clothes pin thereon, means for feeding a clothes pin into said chuck and onto the bent end of the wire, means for rotating the chuck whereby the reenforcing wire is wound around the clothes pin, and means for severing the wire and for forcing the severed end into locking engagement within the slot of the clothes pin.

17. In a machine of the class described, the combination of a chuck adapted to grip and revolve a clothes pin, co-operating die members adapted to bend the leading end of a wire at an angle, one of said die members being adapted to carry the bent end of the wire forwardly into position to receive a clothes pin thereon, means for feeding a clothes pin into said chuck and onto the bent end of the wire, means for rotating the chuck whereby the reenforcing wire is wound around the clothes pin, and means for severing the wire and for forcing the severed end into aligned engagement within the slot of the clothes pin while the clothes pin is held by said chuck.

18. In a machine of the class described, the combination of a chuck adapted to grip and revolve a clothes pin, means for feeding the bent end of a wire into position to receive the clothes pin straddling said bent end, means for rotating the chuck whereby the reenforcing wire is wound around the clothes pin, means for applying resistible pressure from opposite sides of the clothes pin to cause the said wire to bend around the clothes pin, and means for severing the wire and for forcing the severed end into locking engagement within the slot of the clothes pin.

19. In a machine of the class described, the combination of a chuck adapted to grip and revolve a clothes pin, a support adapted to be straddled by the clothes pin, a driver disposed on the opposite side of said clothes pin to said support and in substantially the same horizontal plane with the top thereof, co-operating die members moving at right angles to each other to bend the free end of a wire, means for moving one of said die members into position to present the bent end of the wire in substantial alignment with the top of said support, means for rotating the chuck whereby the reenforcing wire is wound around the clothes pin, and means for severing the wire and for forcing the severed end into locking engagement within the slot of the clothes pin.

20. In a machine of the class described, the combination of a chuck adapted to grip and revolve a clothes pin, a support adapted to be straddled by the clothes pins in position adjacent said chuck, means for bending the free end of a wire and for moving said bent end into line to receive a clothes pin straddling said bent end of the wire, means for feeding a clothes pin from said support onto said bent end of the wire and into the chuck, means for causing the rotation of the chuck whereby the reenforcing wire is wound around the clothes pin, and means for severing the wire and for forcing the severed end into locking engagement within the slot of the clothes pin.

21. In a machine of the class described, the combination of a chuck adapted to grip and revolve a clothes pin, means for bending the free end of a wire and for feeding said bent end in position to receive a clothes pin, straddling said bent end, means for feeding a clothes pin onto said bent end of the wire, means for causing intermittent rotation of said chuck whereby the reenforcing wire is wound around the clothes pin, and means operative during the stationary period of said chuck for severing the wire and for the forcing the severed end into locking engagement within the slot of the clothes pin.

22. In a machine of the class described, the combination of a chuck having jaws adapted to receive a clothes pin laterally therein and to grip and revolve the clothes pin, means for bending the free end of a wire and for feeding said end into position adjacent said chuck, means for feeding the clothes pin laterally into said chuck to straddle said bent end of the wire, means for causing the rotation of the chuck whereby the reenforcing wire is wound around the clothes pin, and means for severing the wire and for forcing the severed end into locking engagement within the slot of the clothes pin.

23. In a machine of the class described, the combination of a chuck having movable jaws adapted to receive a clothes pin laterally therein and to grip and revolve the clothes pin, means for bending the free end of a wire and for feeding said bent end into position to receive the clothes pin, means for feeding a clothes pin laterally into the jaws of said chuck and straddling the bent end of said wire, means for rotating the chuck whereby the reenforcing wire is wound around the clothes pin, means for causing an axial movement of the chuck while revolving, and means for severing the wire and for forcing the severed end into locking engagement within the slot of the clothes pin.

24. In a machine of the class described, the combination of a vertically disposed chuck having movable jaws adapted to receive a clothes pin therein and to grip and revolve the clothes pin, means for feeding a wire having a bent end into position to receive the clothes pin, means for feeding a clothes pin laterally into the jaws of said chuck and straddling the bent end of said wire, means for intermittently rotating said chuck to cause the wire to be wound around the clothes pin, means for severing said wire, and a driver movable into the slot of the clothes pin to carry the free end of the wire into locking engagement therein, and means for reciprocating said driver during the stationary period of said chuck.

25. In a machine of the class described, the combination of a chuck having movable jaws adapted to receive a clothes pin laterally therein and to grip and revolve the clothes pin, means for bending the free end of a wire and for feeding said bent end into position to receive the clothes pin and to support the latter within the jaws of the chuck, means for feeding a clothes pin laterally into the jaws of said chuck and straddling the bent end of said wire, means for closing the jaws of the chuck upon the clothes pin while the latter is supported on said wire, means for revolving the chuck whereby the wire is wound around the clothes pin, and means for severing the wire and for forcing the severed end into locking engagement within the slot of the clothes pin.

26. In a machine of the class described, the combination of a chuck having movable jaws adapted to receive a clothes pin laterally therein, means for opening and closing said jaws, means for rotating said chuck when the jaws are in closed position, and means for applying a reenforcing wire around the clothes pin while the latter is held in said chuck.

27. In a machine of the class described, a chuck having jaws adapted to receive a clothes pin laterally therein, means for opening and closing said jaws, means for revolving said chuck, means for reciprocating said chuck axially, means for feeding clothes pins into said chuck, and means for applying a reenforcing wire around the clothes pin while held by said chuck.

28. In a machine of the class described, a chuck adapted to receive clothes pins laterally therein and to grip and revolve the clothes pins, means for feeding a wire into position to support the clothes pin within the chuck, a support adapted to be straddled by the clothes pins and to guide them onto said wire, reciprocating means for engaging the clothes pins to advance them along said support, means to prevent retrograde movement of said clothes pins on said support during the retraction of said feeding arms, said chuck being adapted to cause the wire to be wound around the clothes pin, and means for cutting the wire and for forcing the severed end into the slot of the clothes pin.

29. In a machine of the class described, the combination of a chuck adapted to grip and revolve a clothes pin, means for feeding a wire into position to receive the clothes pin, straddling said wire, a member for applying outward resistance against the wire to cause it to bend around said clothes pin when the latter is revolved by said chuck, a finger for applying opposing pressure to the clothes pin, means for moving said latter two means into and out of operative relation to the clothes pin, means for applying resistible pressure to said finger when in operative relation to the clothes pin, and means for severing the wire and for forcing the severed end into the slot of the clothes pin.

30. In a machine of the class described, the combination of a chuck for gripping and revolving the clothes pin, and means for applying a reenforcing wire to the clothes pin, and means for feeding the clothes pin to said chuck, comprising a rail adapted to be straddled by the clothes pins, and a belt traveling over said rail and adapted to be straddled by the clothes pin whereby said belt conveys the same along said rail.

31. In a machine of the class described, a chuck adapted to grip and revolve a clothes pin, means for applying a reenforcing wire around the clothes pin while held by said chuck, and means for feeding clothes pins to said chuck, comprising a belt adapted to be straddled by the clothes pin, whereby they are propelled by said belt, and a stationary rail adapted to receive the clothes pins from said belt in straddling relation and adapted to support the clothes pin to a point adjacent said chuck.

32. In a machine for handling clothes pins, the combination of a hopper, a member for receiving clothes pins individually from said hopper, and a tilting member arranged in the path of the clothes pins as they are delivered from said individual member, and so arranged as to cause the clothes pins to drop prong end downwardly.

33. In a machine for handling clothes pins, means for feeding clothes pins successively, comprising a support adapted to receive clothes pins straddling the same, means for guiding the clothes pins out of said support, and means for rotating the clothes pins while in said guiding means to insure the straddling of the clothes pin on said support.

34. In a machine for handling clothes pins, means for feeding clothes pins successively, comprising a support adapted to receive the clothes pins straddling the same, means for guiding the clothes pins onto said support, and means for rotating said clothes pins while in said guiding means to insure the straddling of the clothes pin on said support, comprising a revolving member having whipping means for engaging the clothes pin to revolve the same but to permit the clothes pin to drop when the prongs are in straddling relation to said support.

35. In a machine for handling clothes pins, means for feeding clothes pins in successive relation, including a movable support adapted to receive the clothes pins straddling the support, a tube for guiding the clothes pins onto said traveling support, said tube having an open side adjacent the suport through which a portion of the clothes pin may pass when straddling the support, and a revolvable member engaging laterally against the clothes pin while in said tube, to rotate the same to bring the prongs of the clothes pin into straddling relation with said movable support.

36. In a machine for handling clothes pins, means for feeding clothes pins successively, comprising a movable support adapted to receive clothes pins straddling the support, a tube for guiding the clothes pins onto said support, said tube having an open side through which a portion of the clothes pin may pass when straddling the support, a revolving member having spring arms provided with free ends projecting therefrom and adapted to whip against the clothes pin while in said tube for the purpose of revolving the clothes pin to bring the prongs in straddling relation with said movable support.

37. In a machine of the class described, means for applying a reenforcing wire to a clothes pin and means for feeding the clothes pins thereto, including a belt and pulley adapted to receive the clothes pins in straddling relation thereon, a rail adapted to receive the clothes pins from said belt, and means for temporarily lifting the clothes pins as they pass from the support on said belt onto said rail.

38. In a machine of the class described, means for applying reenforcing wire to clothes pins and means for feeding clothes pins thereto, including a belt and a pulley adapted to receive clothes pins in straddling relation thereon, a supporting rail adapted to receive the clothes pins in straddling relation from said belt, means for engaging the lower ends of the clothes pins to lift them temporarily while they are passing from said belt onto said rail, and means for periodically operating said lifting means.

39. In a machine of the class described, the combination of means for applying a reenforcing wire to a clothes pin and means for feeding clothes pins thereto, comprising a supporting rail adapted to receive the clothes pins in straddling relation, said rail having a shoulder on the top thereof to prevent retractive motion by the clothes pin after passing said shoulder, and means for feeding the clothes pins off said rail.

Signed at the city, county, and State of New York, this 16th day of November, 1928.

SIGMUND BOWER.